Patented June 11, 1935

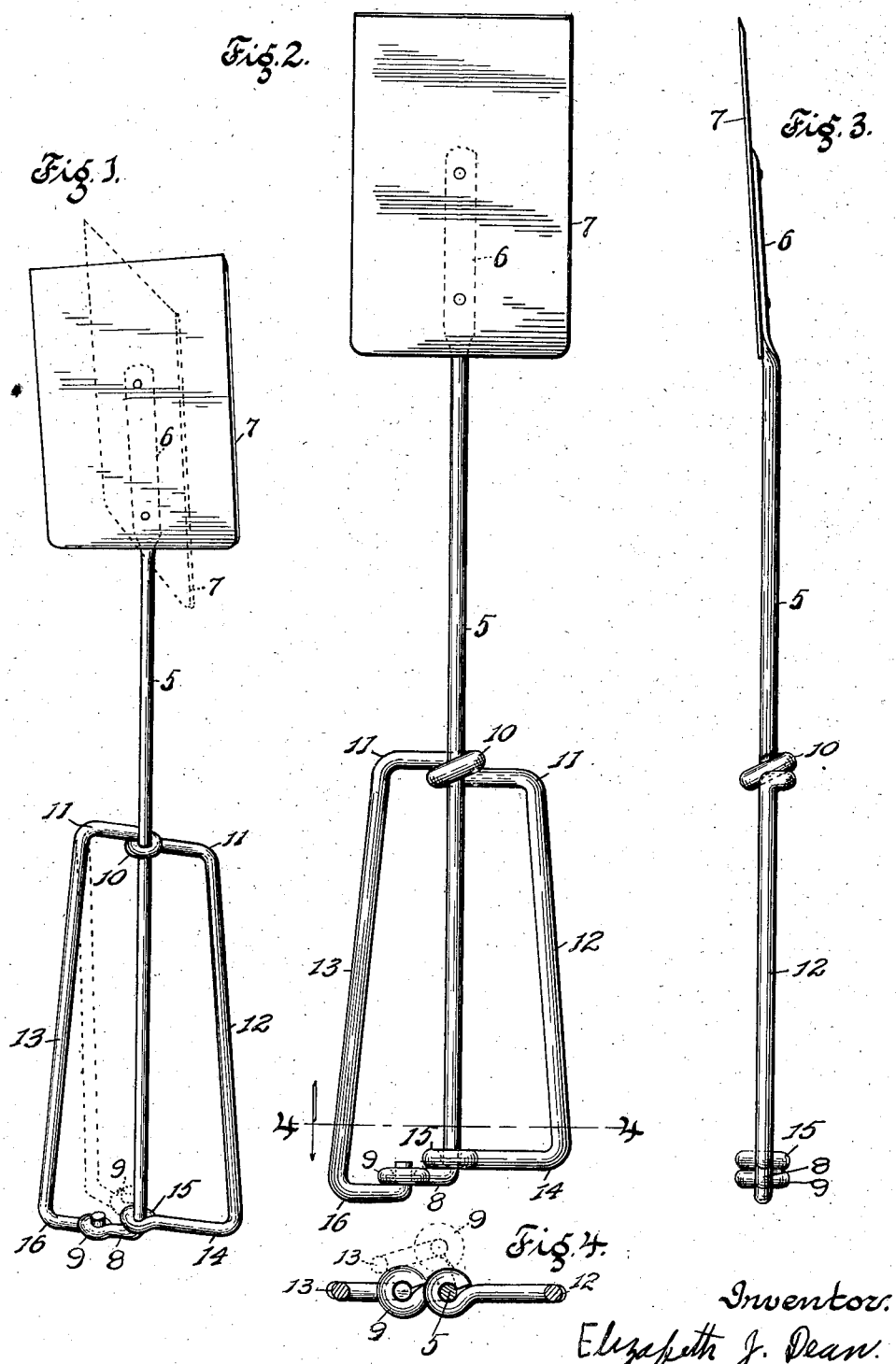

2,004,782

UNITED STATES PATENT OFFICE 2,004,782

KITCHEN IMPLEMENT

Elizabeth J. Dean, St. Louis, Mo.

Application July 16, 1934, Serial No. 735,301

1 Claim. (Cl. 294—7)

This invention relates to improvements in a kitchen implement of that class appertaining to griddle cake turners, and has for its object a handle which when pressed by the hand will cause the shovel-like end to make a turn thereby inverting or turning the cake on the griddle.

The shovel-like end may be in the form of a spoon, dipper or other formation, but the essential feature is the construction of the handle by which the same is turned under pressure of the hand.

Heretofore in handling griddle cakes it is necessary to turn the cake by turning the entire implement, such as the common pan-cake turner now in use, the movement is slow and quite a strain on the wrist of the operator, but by constructing a handle as shown, the mere squeezing of the wire strands causes the shovel like end to rapidly turn instantly inverting the cake without the least turning of the hand or wrist.

The device is simple, unique, and operative in every respect, and relieves the tiresome action of the hand in its operation.

Figure 1 is a perspective view of my complete kitchen implement.

Figure 2 is a plan view of the same.

Figure 3 is a side view of the same.

Figure 4 is a horizontal sectional view taken on the line 4—4 of Figure 2 and viewing the same in the direction indicated by the arrow.

In the general construction of my invention, I provide a handle consisting of a central strand 5 the free end of which is suitably flattened as shown at 6 and to which is attached in any desirable manner the shovel like member 7 which is designed to be brought in contact with the griddle cake for the purpose of turning the same during the baking process.

The opposite end of the central strand 5 is bent at right angles as indicated by the numeral 8 and is formed into an eye or circular loop 9.

On the central strand 5 is positioned a manipulating member consisting of a strand bent and formed with a loop 10 encircling the strand; the same is again bent as indicated by the numerals 11 forming two gripping members 12 and 13; the member 12 is again bent at 14 and its end formed into an eye or loop 15 encircling the central strand as shown.

The member 13 has its lower end bent at 16, and its end turned upwardly at right angles and entering the eye or loop 9 of the central strand. The material of which the handle is formed is of springy substance so that when the members 12 and 13 are gripped and pressed together it will cause the member 13 to turn the central strand in a position as shown by dotted lines in Figure 4, thereby turning the shovel end 7 in a quick manner instantly turning the cake.

As stated the material being of springy substance will cause the implement to return to its normal position immediately when pressure on the handle is released.

In equipping the end with a dipper or spoon, the product being treated can be readily agitated or stirred by repeatedly manipulating the handle.

I do not desire to limit myself to the precise form of cake turning portion of the implement as any form applicable may be used for turning as well as agitating the foods handled.

Some and other changes may be made in the construction and arrangement of the invention above set forth without departing from the real spirit and purpose thereof; and it is my intention to cover by the following claim any modified form of structure or use of equivalents which may be reasonably included within their scope.

Having fully described my invention what I claim is:

An article of the character described comprising a central staff, a food supporting means attached to one end thereof, the other end of said staff being bent at right angles and provided with an eye, a handle consisting of a wire looped around the staff then bent downwardly forming gripping members, one end of one of the gripping members looped around the staff immediately above the right angular bend, the end of the other gripping member extending into the eye of the right angular bend, said gripping members when pressed together imparting motion to the staff and food supporting member.

ELIZABETH J. DEAN.